US006965692B1

(12) United States Patent
Ford

(10) Patent No.: US 6,965,692 B1
(45) Date of Patent: Nov. 15, 2005

(54) METHOD AND APPARATUS FOR IMPROVING THE QUALITY OF RECONSTRUCTED INFORMATION

(75) Inventor: Benjamin C. Ford, Austin, TX (US)

(73) Assignee: Eastman Kodak Company, Rochester, NY (US)

( * ) Notice: Subject to any disclaimer, the term of this patent is extended or adjusted under 35 U.S.C. 154(b) by 419 days.

(21) Appl. No.: 09/605,185

(22) Filed: Jun. 28, 2000

Related U.S. Application Data

(60) Provisional application No. 60/174,025, filed on Dec. 30, 1999.

(51) Int. Cl.$^7$ .............................................. G06K 9/00
(52) U.S. Cl. ................................................... 382/167
(58) Field of Search ........ 382/162–167; 358/518–540; 348/222.1–240, 260

(56) References Cited

U.S. PATENT DOCUMENTS

| | | | |
|---|---|---|---|
| 2,404,138 A | 7/1946 | Mayer ............................. | 95/94 |
| 3,520,689 A | 7/1970 | Nagae et al. .................... | 96/55 |
| 3,520,690 A | 7/1970 | Nagae et al. .................... | 96/55 |
| 3,587,435 A | 6/1971 | Chioffe ........................... | 95/89 |
| 3,615,479 A | 10/1971 | Kohler et al. .................... | 96/48 |
| 3,615,498 A | 10/1971 | Aral ............................... | 96/55 |
| 3,617,282 A | 11/1971 | Bard ............................... | 96/59 |
| 3,747,120 A | 7/1973 | Stemme ........................ | 346/75 |
| 3,903,541 A | 9/1975 | Von Meister et al. ........ | 354/317 |
| 3,946,398 A | 3/1976 | Kyser et al. .................... | 346/1 |
| 3,959,048 A | 5/1976 | Stanfield et al. .............. | 156/94 |
| 4,026,756 A | 5/1977 | Stanfield et al. ............. | 156/554 |
| 4,081,577 A | 3/1978 | Horner ........................ | 427/424 |
| 4,142,107 A | 2/1979 | Hatzakis et al. ............. | 250/571 |
| 4,215,927 A | 8/1980 | Grant et al. ................. | 354/317 |
| 4,249,985 A | 2/1981 | Stanfield ...................... | 156/554 |
| 4,301,469 A | 11/1981 | Modeen et al. ............... | 358/75 |
| 4,490,729 A | 12/1984 | Clark et al. ................... | 346/75 |
| 4,501,480 A | 2/1985 | Matsui et al. ............... | 354/298 |
| 4,564,280 A | 1/1986 | Fukuda ....................... | 354/317 |
| 4,594,598 A | 6/1986 | Iwagami ..................... | 346/140 |
| 4,621,037 A | 11/1986 | Kanda et al. ................. | 430/30 |
| 4,623,236 A | 11/1986 | Stella ......................... | 354/318 |
| 4,636,808 A | 1/1987 | Herron ......................... | 346/75 |
| 4,666,307 A | 5/1987 | Matsumoto et al. ........ | 356/404 |
| 4,670,779 A | 6/1987 | Nagano ....................... | 358/75 |

(Continued)

FOREIGN PATENT DOCUMENTS

EP          0 261 782 A2     8/1987       ............ H04N 1/46

(Continued)

OTHER PUBLICATIONS

"*Adaptive Fourier Threshold Filtering: A Method to Reduce Noise and Incoherent Artifacts in High Resolution Cardiac Images*", Doyle, M., et al., 8306 Magnetic Resonance in Medicine 31, No. 5, Baltimore, MD, May, pp. 546-550, 1994.

(Continued)

*Primary Examiner*—Jingge Wu
(74) *Attorney, Agent, or Firm*—Simon, Galasso & Frantz; David A. Novais

(57) ABSTRACT

Image processing apparatus and methods according to the present invention are described in which data for each color channel are separately processed, on a pixel by pixel basis, such that the data associated with the primary color channel is filtered less than the crosstalk information associated with a non-primary color channel. In a specific embodiment, the data associated with the primary color channel is not filtered at all. When data is processed in this manner, minimal loss of image detail results, with a significant reduction in crosstalk noise.

32 Claims, 2 Drawing Sheets

U.S. PATENT DOCUMENTS

| | | | |
|---|---|---|---|
| 4,736,221 A | 4/1988 | Shidara | 354/317 |
| 4,745,040 A | 5/1988 | Levine | 430/21 |
| 4,755,844 A | 7/1988 | Tsuchiya et al. | 354/317 |
| 4,777,102 A | 10/1988 | Levine | 430/21 |
| 4,796,061 A | 1/1989 | Ikeda et al. | 355/73 |
| 4,814,630 A | 3/1989 | Lim | 250/578 |
| 4,821,114 A | 4/1989 | Gebhardt | 358/75 |
| 4,845,551 A | 7/1989 | Matsumoto | 358/80 |
| 4,851,311 A | 7/1989 | Millis et al. | 430/30 |
| 4,857,430 A | 8/1989 | Millis et al. | 430/30 |
| 4,875,067 A | 10/1989 | Kanzaki et al. | 354/325 |
| 4,969,045 A | 11/1990 | Haruki et al. | 358/228 |
| 4,994,918 A | 2/1991 | Lingemann | 358/214 |
| 5,034,767 A | 7/1991 | Netz et al. | 354/317 |
| 5,101,286 A | 3/1992 | Patton | 358/487 |
| 5,124,216 A | 6/1992 | Giapis et al. | 430/30 |
| 5,149,960 A | 9/1992 | Dunne et al. | 250/226 |
| 5,155,596 A | 10/1992 | Kurtz et al. | 358/214 |
| 5,196,285 A | 3/1993 | Thomson | 430/30 |
| 5,212,512 A | 5/1993 | Shiota | 354/319 |
| 5,231,439 A | 7/1993 | Takahashi et al. | 354/313 |
| 5,235,352 A | 8/1993 | Pies et al. | 346/140 |
| 5,255,408 A | 10/1993 | Blackman | 15/308 |
| 5,266,805 A | 11/1993 | Edgar | 250/330 |
| 5,267,030 A | 11/1993 | Giorgianni et al. | 358/527 |
| 5,292,605 A | 3/1994 | Thomson | 430/30 |
| 5,296,923 A | 3/1994 | Hung | 358/527 |
| 5,350,651 A | 9/1994 | Evans et al. | 430/21 |
| 5,350,664 A | 9/1994 | Simons | 430/362 |
| 5,357,307 A | 10/1994 | Glanville et al. | 354/324 |
| 5,360,701 A | 11/1994 | Elton et al. | 430/501 |
| 5,371,542 A | 12/1994 | Pauli et al. | 348/262 |
| 5,391,443 A | 2/1995 | Simons et al. | 430/21 |
| 5,414,779 A | 5/1995 | Mitch | 382/199 |
| 5,416,550 A | 5/1995 | Skye et al. | 354/298 |
| 5,418,119 A | 5/1995 | Simons | 430/507 |
| 5,418,597 A | 5/1995 | Lahcanski et al. | 355/76 |
| 5,432,579 A | 7/1995 | Tokuda | 354/293 |
| 5,436,738 A | 7/1995 | Manico | 358/503 |
| 5,440,365 A | 8/1995 | Gates et al. | 354/298 |
| 5,447,811 A | 9/1995 | Buhr et al. | 430/20 |
| 5,448,380 A | 9/1995 | Park | 358/520 |
| 5,452,018 A | 9/1995 | Capitant et al. | 348/651 |
| 5,465,155 A | 11/1995 | Edgar | 358/500 |
| 5,467,412 A * | 11/1995 | Capitant et al. | 382/167 |
| 5,496,669 A | 3/1996 | Pforr et al. | 430/22 |
| 5,509,086 A * | 4/1996 | Edgar et al. | 382/167 |
| 5,516,608 A | 5/1996 | Hobbs et al. | 430/30 |
| 5,519,510 A | 5/1996 | Edgar | 358/471 |
| 5,546,477 A | 8/1996 | Knowles et al. | 382/242 |
| 5,550,566 A | 8/1996 | Hodgson et al. | 345/202 |
| 5,552,904 A | 9/1996 | Ryoo et al. | 358/518 |
| 5,563,717 A | 10/1996 | Koeng et al. | 358/406 |
| 5,568,270 A | 10/1996 | Endo | 358/298 |
| 5,576,836 A | 11/1996 | Sano et al. | 358/302 |
| 5,581,376 A | 12/1996 | Harrington | 358/518 |
| 5,596,415 A | 1/1997 | Cosgrove et al. | 358/296 |
| 5,627,016 A | 5/1997 | Manico | 430/434 |
| 5,664,253 A | 9/1997 | Meyers | 396/603 |
| 5,664,255 A | 9/1997 | Wen | 396/627 |
| 5,667,944 A | 9/1997 | Reem et al. | 430/359 |
| 5,673,336 A | 9/1997 | Edgar et al. | 382/167 |
| 5,678,116 A | 10/1997 | Sugimoto et al. | 396/611 |
| 5,691,118 A | 11/1997 | Haye | 430/357 |
| 5,695,914 A | 12/1997 | Simon et al. | 430/379 |
| 5,698,382 A | 12/1997 | Nakahanada et al. | 430/418 |
| 5,726,773 A | 3/1998 | Mehlo et al. | 358/474 |
| 5,739,897 A | 4/1998 | Frick et al. | 355/40 |
| 5,771,107 A | 6/1998 | Fujimoto et al. | 358/464 |
| 5,790,277 A | 8/1998 | Edgar | 358/487 |
| 5,805,213 A * | 9/1998 | Spaulding et al. | 348/222.1 |
| 5,835,811 A | 11/1998 | Tsumura | 396/598 |
| 5,870,172 A | 2/1999 | Blume | 355/27 |
| 5,880,819 A | 3/1999 | Tanaka et al. | 355/75 |
| 5,892,595 A | 4/1999 | Yamakawa et al. | 358/530 |
| 5,930,388 A | 7/1999 | Murakami et al. | 382/167 |
| 5,963,662 A | 10/1999 | Vachtsevanos et al. | 382/150 |
| 5,966,465 A | 10/1999 | Keith et al. | 382/232 |
| 5,979,011 A | 11/1999 | Miyawaki et al. | 15/308 |
| 5,982,936 A | 11/1999 | Tucker et al. | 382/233 |
| 5,982,937 A | 11/1999 | Accad | 382/239 |
| 5,982,941 A | 11/1999 | Loveridge et al. | 382/260 |
| 5,982,951 A | 11/1999 | Katayama et al. | 382/284 |
| 5,988,896 A | 11/1999 | Edgar | 396/604 |
| 5,991,444 A | 11/1999 | Burt et al. | 382/232 |
| 5,998,109 A | 12/1999 | Hirabayashi | 430/434 |
| 6,000,284 A | 12/1999 | Shin et al. | 73/150 |
| 6,005,987 A | 12/1999 | Nakamura et al. | 382/294 |
| 6,065,824 A | 5/2000 | Bullock et al. | 347/19 |
| 6,069,714 A | 5/2000 | Edgar | 358/487 |
| 6,089,687 A | 7/2000 | Helterline | 347/7 |
| 6,101,273 A | 8/2000 | Matama | 382/169 |
| 6,102,508 A | 8/2000 | Cowger | 347/7 |
| 6,137,965 A | 10/2000 | Burgeios et al. | 396/626 |
| 6,442,301 B1 * | 8/2002 | Edgar | 382/275 |
| 6,574,365 B1 * | 6/2003 | Weldy | 382/167 |
| 6,687,414 B1 * | 2/2004 | Edgar | 382/275 |

FOREIGN PATENT DOCUMENTS

| | | | | |
|---|---|---|---|---|
| EP | 0 422 220 A1 | 3/1989 | | A61B 6/03 |
| EP | 0 482 790 B1 | 9/1991 | | H04N 1/40 |
| EP | 0 525 886 A3 | 7/1992 | | G03D 5/00 |
| EP | 0 580 293 A1 | 6/1993 | | H04N 1/04 |
| EP | 0 669 753 A2 | 2/1995 | | H04N 1/407 |
| WO | WO 90/01240 | 2/1990 | | H04N 1/40 |
| WO | WO 91/09493 | 6/1991 | | H04N 5/217 |
| WO | WO 97/25652 | 7/1997 | | G03D 5/00 |
| WO | WO 98/19216 | 5/1998 | | G03C 5/29 |
| WO | WO 98/25399 | 6/1998 | | H04N 1/38 |
| WO | WO 98/31142 | 7/1998 | | H04N 5/253 |
| WO | WO 98/34157 | 8/1998 | | |
| WO | WO 98/34397 | 8/1998 | | |
| WO | WO 99/43148 | 8/1999 | | H04N 1/00 |
| WO | WO 01/01197 | 1/2001 | | G03D 5/00 |
| WO | WO 01/13174 A1 | 2/2001 | | G03D 5/06 |

OTHER PUBLICATIONS

"Anisotropic Spectral Magnitude Estimation Filters for Noise Reduction and Image Enhancement", Aich, T., et al., Philips GmbH Research Laboratories, IEEE, pp. 335-338, 1996.

"Adaptive-neighborhood filtering of images corrupted by signal-dependent noise", Rangayyan, R., et al., Applied Optics, vol. 37, No. 20, pp. 4477-4487, Jul. 10, 1998.

"Grayscale Characteristics", The Nature of Color Images, Photographic Negatives, pp. 163-168.

"Parallel Production of Oligonucleotide Arrays Using Membranes and Reagent Jet Printing", Stimpson, D., et al., Research Reports, BioTechniques, vol. 25, No. 5, pp. 886-890, 1998.

"Low-Cost Display Assembly and Interconnect Using Ink-Jet Printing Technology", Hayes, D. et al., Display Works '99, MicroFab Technologies, Inc., pp. 1-4, 1999.

"Ink-Jet Based Fluid Microdispensing in Biochemical Applications", Wallace, D., MicroFab Technologies, Inc., Laboratory Automation News, vol. 1, No. 5, pp. 6-9, Nov., 1996.

"*Protorealistic Ink-Jet Printing Through Dynamic Spot Size Control*", Wallace, D., Journal of Imaging Science and Technology, vol. 40, No. 5, pp. 390-395, Sep./Oct. 1996.

"*MicroJet Printing of Solder and Polymers for Multi-Chip Modules and Chip-Scale Package*", Hayes, D., et al., MicroFab Technologies, Inc.

"*A Method of Characterisstics Model of a Drop-on-Demand Ink-Jet Device Using an Integral Method Drop Formation Model*", Wallace, D., MicroFab Technologies, Inc., The American Society of Mechanical Engineers, Winter Annual Meeting, pp. 1-9, Dec. 10-15, 1989.

"*Digital Imaging Equipment White Papers*", Putting Damaged Film on ICE, www.nikonusa.com/reference/whitepapers/imaging, Nikon Corporation, Nov. 28, 2000.

* cited by examiner

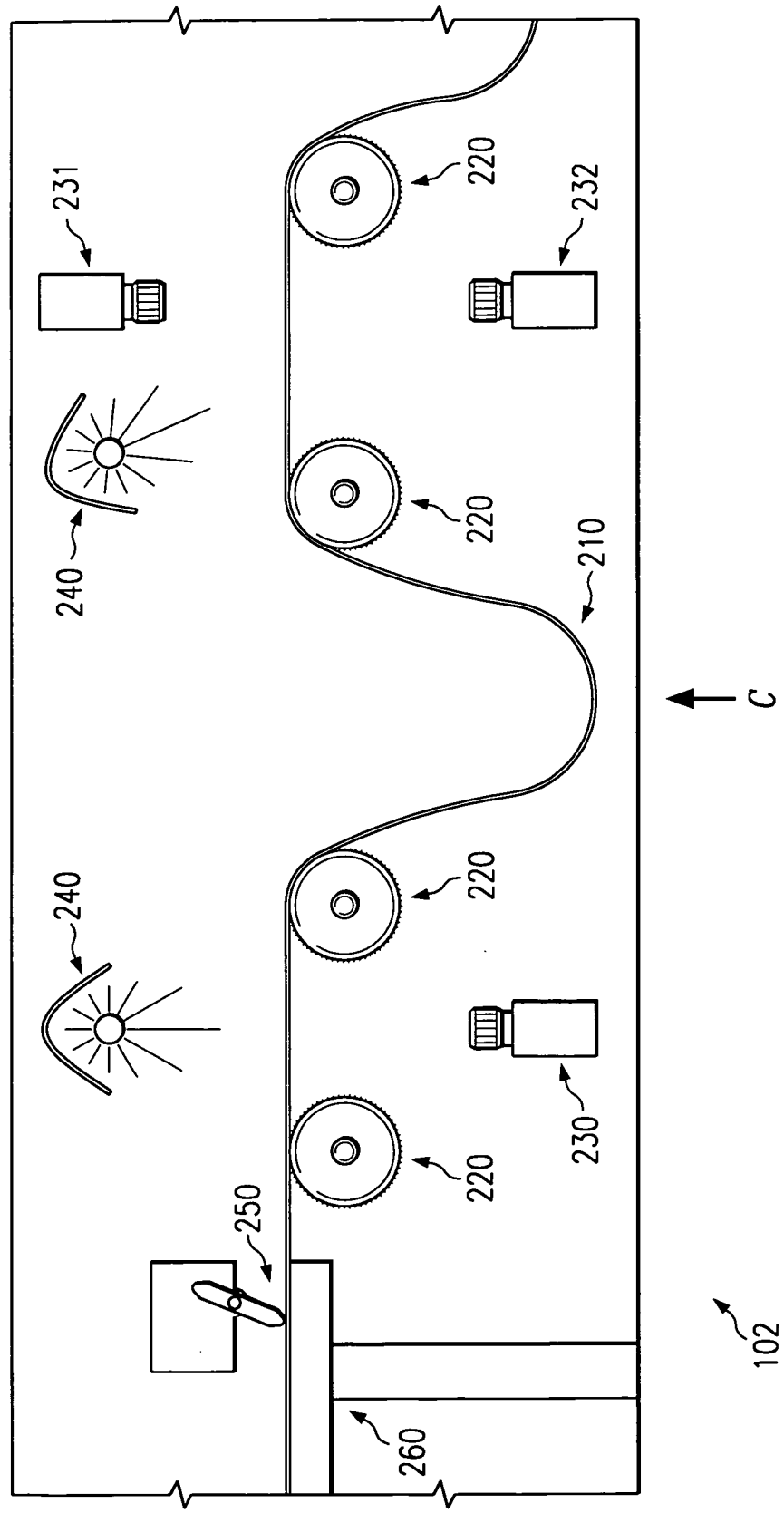

METHOD AND APPARATUS FOR IMPROVING THE QUALITY OF RECONSTRUCTED INFORMATION

CROSS REFERENCE TO RELATED APPLICATIONS

This application claims the benefit of United States Provisional Patent Application Ser. No. 60/174,025 filed Dec. 30, 1999 entitled "METHOD AND APPARATUS FOR IMPROVING THE QUALITY OF RECONSTRUCTED INFORMATION," of common assignee herewith.

FIELD OF THE INVENTION

The present invention relates generally to electronic image enhancement, and more particularly to processing images obtained from multiple information channels.

BACKGROUND OF THE INVENTION

Photographic film is often used as a medium for recording a source image, and is constructed such that an image is recorded on one or more film layers that each contains photosensitive material, such as solar halide. Color photographic film is constructed using multiple film layers such that different image color information is recorded in different film layers according to the physical composition of each film layer. In general, one layer collects color information on each of the primary colors red, green and blue. Accordingly, these layers are referred to as the red, green and blue layers. Using these different layers effectively divides the source image according to its primary color components. However, each color layer also records some information from the other two color channels. For example, some red information becomes recorded on the green and blue film layers, some green information becomes recorded on the red and blue film layers, and some blue information becomes recorded on the red and green layers. This information associated with other channels will be referred to as crosstalk, or crosstalk information.

The field of electronic image processing electronically records, or digitizes, a representation of the source image. In conventional color scanning systems, separate red, green and blue sensing elements provide the red, green and blue information in separate information channels. These information channels are subsequently superimposed over each other in order to replicate the image. This process can degrade the resulting image if color separation between the red, green and blue information channels is not adequately maintained. In electronic film development, maintaining color separation between channels is inherently difficult, because of crosstalk, mentioned earlier.

Crosstalk, and particularly color channel crosstalk, can occur during the process of converting an image into a machine readable form. In conventional color scanning systems, the captured image information is typically tagged or otherwise conventionally identified according to its separable color and/or other image attributes, thereby facilitating separate information processing, computer display and printing.

As with electronic film development systems, conventional color scanning systems do not guarantee desired channel separation. Rather, a potential exists in such systems for variances in source medium characteristics such as film or document surface defects, light source or sensor tolerances, light reflection, refraction and absorption variations, and so on. Therefore, as with photographic film, using an image capture system can also result in channel crosstalk.

Noise can also be a problem in converting physical images to electronic representations. While crosstalk causes non-primary information to be included within a given channel, such non-primary information nevertheless is actual image information that is useful in accurately reconstructing the image. In contrast, noise is an image information anomaly, which will detrimentally affect the overall quality of a reproduced image.

Noise combined with crosstalk can be especially problematic, because noise tends tend to spread to all of the channels being operated upon. For example, noise in the red channel affects blue crosstalk information that exists in the red channel. When the blue crosstalk information from the red channel is recombined with the blue information from the blue channel, it brings some varying percentage of the noise from the red channel with it. This transferred noise tends to adversely affect the recombined information.

Accordingly, there remains a need in the art for an improved multiple-channel image processing.

SUMMARY OF THE INVENTION

In accordance with one implementation of the present invention, a method for electronic image processing is provided. In this implementation the information is separately processed for each color channel, on a pixel by pixel basis, such that the information associated with the primary color channel is filtered less than the crosstalk information associated with a non-primary color channel. In a specific implementation, the information associated with the primary color channel is not filtered at all. An advantage of this implementation is that there is generally a minimal loss of image detail, with a significant reduction in crosstalk noise.

In another implementation of this present invention the back, through, and front channels of information obtained from scanning a developing image are processed in order to maximize the source red, green and blue data. Thus, red channel information is obtained by processing back channel information that is filtered less than the through and front channel data. The green channel information is obtained by processing the through channel that is filtered less than the back and front channel data. The blue channel information is obtained by processing front channel information that is filtered less than the back and through channel data. In a preferred embodiment, the primary channel information is not filtered at all.

As a result, at least one embodiment of the present invention decreases crosstalk noise, and the decrease in crosstalk noise that is achieved generally outweighs the loss of image detail that occurs as a result of the non-primary channels being filtered more than the primary color channel.

The present invention also provides a method for improving the quality of reconstructed information. In one embodiment, the method comprises obtaining information from a primary information channel to be reconstructed, and obtaining information from additional information channels. At least a portion of the information from the additional information channels includes information associated with the information obtained from the primary channel. The method further comprises applying a transform to the information obtained from the additional information channels, and combining at least a portion of the transformed information with at least a portion of the primary channel information. Another embodiment of the present invention uses the method just described to generate a digital file tangibly embodied in a computer readable medium.

The present invention further provides a method for correcting image information associated with a plurality of information channels. In a preferred embodiment, the method comprises obtaining image information from a first information channel, and obtaining image information from at least one additional information channel, wherein at least a portion of the information from the at least one additional information channel includes information associated with the information obtained from the first channel. The method further comprises transforming the image information obtained from the at least one additional information channel to obtain transformed image information associated with the first channel, and combining at least a portion of the transformed image information associated with the first information channel with at least a portion of the information from the first information channel to obtain corrected image information associated with the first information channel.

Another embodiment of the present invention implements a digital file tangibly embodied in a computer readable medium. In a preferred embodiment, the digital file is an improved, reconstructed, or corrected image generated according to a method of the present invention.

Yet another embodiment of the present invention provides for an image processing system comprising at least one illumination source capable of illuminating a physical medium having a plurality of information channels thereon, and at least one detector enabled to generate electrical signals in response to light, the electrical signals representative of image information obtained from a first information channel and at least one additional information channel, wherein at least a portion of the information from the at least one additional information channel includes information associated with the information obtained from the first channel, and the detector further enabled to output the electrical signals for image processing. The image processing system also comprises at least one processor, memory operably associated with the processor, and a program of instructions capable of being stored in the memory and executed by the processor. The program of instructions is enabled to transform the image information obtained from the at least one additional information channel to obtain transformed image information associated with the first channel, and to combine at least a portion of the transformed image information associated with the first information channel with at least a portion of the information from the first information channel to obtain corrected image information associated with the first information channel.

An advantage of at least one embodiment of the present invention is that multiple-channel image information can be processed while avoiding a substantial loss of source image information.

Another advantage of the present invention is that the amount of noise added to a primary information channel due to multiple-channel image processing can be reduced.

Yet another advantage of at least one embodiment of the present invention is that color separation between the color channels on color film can be enhanced.

Other objects, advantages, features and characteristics of the present invention, as well as methods, operation and functions of related elements of structure, and the combination of parts and economies of manufacture, will become apparent upon consideration of the following description and claims with reference to the accompanying drawings, all of which form a part of this specification.

BRIEF DESCRIPTION OF THE DRAWINGS

In describing the preferred embodiments of the present invention, reference is made to the following figures, wherein like reference numerals designate corresponding parts in the various figures, and wherein:

FIG. 2 is a diagram illustrating a preferred embodiment of an electronic film development scanner according to the present invention;

DETAILED DESCRIPTION OF A PREFERRED EMBODIMENT OF THE INVENTION

In the following detailed description of the preferred embodiments, reference is made to the accompanying drawings which form a part hereof, and in which is shown by way of illustration specific embodiments in which the invention may be practiced. These embodiments are described in sufficient detail to enable those skilled in the art to practice the invention, and it is to be understood that other embodiments may be utilized and that logical, mechanical and electrical changes may be made without departing from the spirit or scope of the invention. To avoid detail not necessary to enable those skilled in the art to practice the invention, the description may omit certain information known to those skilled in the art. The following detailed description is, therefore, not to be taken in a limiting sense, and the scope of the present invention is defined only by the appended claims.

The following definitions will aid the reader in properly interpreting the following detailed description of the present invention. The word "light", as used herein, refers to electromagnetic energy, and preferably electromagnetic energy with frequencies generally in the range of $10^{12}$ Hz to $10^{17}$ Hz, and includes visible light as well as portions of the infrared and ultraviolet spectrum. The term, "transform," is used consistent with its common mathematical meaning, and generally relates to performing systematic alterations of mathematical representations of objects according to predetermined rules. A transform may alter the position, size, or nature of an object by moving it to another location (translation), making it larger or smaller (scaling), turning it (rotation), changing its description from one type of coordinate system to another, and so on. For example, a transform may be used to determine the shape of a sphere projected upon a given plane, or to cross-correlate electronic signals to filter out gaussian noise. "Channel," as used herein, relates to a medium for transferring information. A channel can carry information (data, sound, video, etc.) in either analog or digital form, and can be a physical link, such as the cable connecting two stations in a network, or it can consist of some electromagnetic transmission of one or more frequencies within a bandwidth in the electromagnetic spectrum, as in radio and television, or in optical, microwave, or voice-grade communication.

Figure 1:
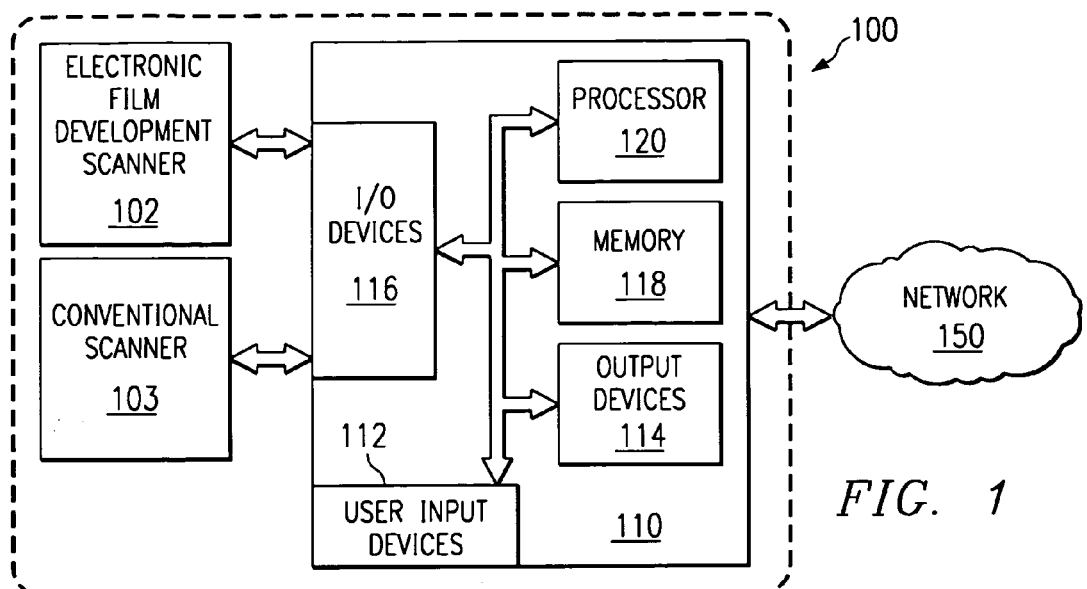
FIG. 1 is a functional diagram illustrating a preferred apparatus useful for performing image processing accordance with the present invention.
Figure 3:
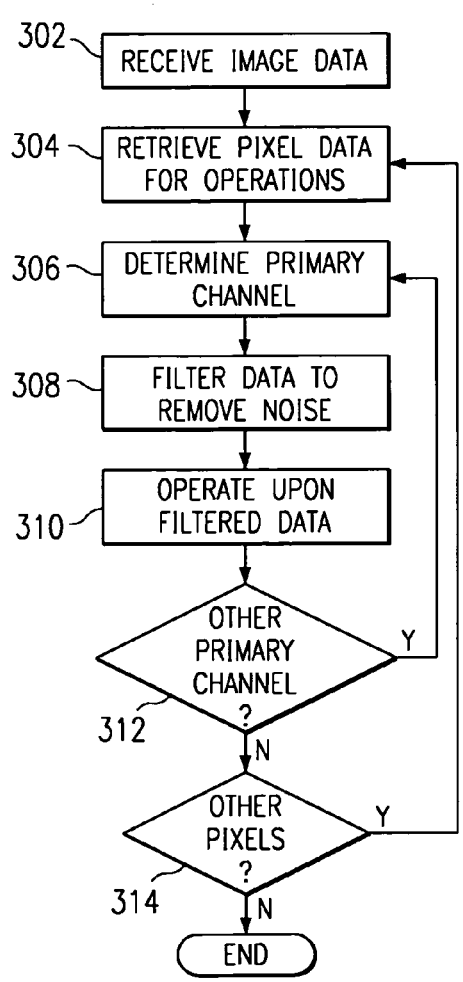
FIG. 3 is a flowchart illustrating a preferred method for performing image processing according to the invention.

FIGS. 1–3 illustrate an apparatus and method for electronic image processing according to the present invention. An electronic image processing system is illustrated in FIG.

1, and designated generally by reference numeral 100. Electronic image processing system 100 may comprise a combination of hardware and software components such as electronic film development scanner 102, and computer 110. Computer 110 may include I/O devices 116, memory 118, processor 120, output devices 1114, and user input devices 112. Computer 110 is preferably capable of executing a program of instructions (commonly referred to as application software) that implements the methods described hereinafter. The application software causes computer 110 to process information, such as image information received from electronic film development scanner 102, conventional scanner 103, or via network 150. In one embodiment, the program of instructions manipulates the image information by applying filtering algorithms to filter out noise from multiple-channel image information before reassembling the information to create the final image. This allows electronic film processing system 100 to produce images with a color and clarity that are otherwise unattainable.

Electronic film development system 100 includes an electronic film development scanner 102, in which front, back and through image information are obtained at different time-scan periods for each negative that is being developed. Referring now to FIG. 2, one embodiment of electronic film development scanner 102 will be discussed. In the embodiment illustrated in FIG. 2, electronic film development scanner 102 comprises table 260, rollers 220, cameras 230, 231, and 232, infrared (IR) lights 240, and extruder 250. All of these elements cooperate to develop film 210 and capture images during the development period.

Table 260 is provided as a support for film 210, and facilitates an even distribution of developer dispensed by extruder 250. In a preferred embodiment extruder 250 extrudes a viscous liquid developing fluid onto film 210. Rollers 220 move film 210 through electronic film development scanner 102. Cameras 230, 231 and 232, and infrared (IR) lights 240 are positioned at appropriate locations along the path of film 210 to capture IR images during various stages of development. Cameras 230, 231 and 232 may be positioned to record images using reflected light, transmitted light, or a combination of reflected and transmitted light provided by IR lights 240. The speed at which various portions of film 210 are moved through image capture hardware 200 may be varied. For example, in FIG. 2, film 210 is moving faster at point A, and slower at point B. The difference in speed is compensated for by allowing film 210 to form a loop at point C. Images captured using electronic film development scanner 102 are provided to computer 110 (FIG. 1) for image processing.

Computer system 110 is shown in FIG. 1 as including user input devices 112, such as a keyboard or mouse, output devices 114 such as a printer or modem, information input/output devices 116, such as a communication interface, for inputting and outputting data, as well as memory 118, such as cache, ram and other computer memory, which can be directly accessible to the processor 120 or alternatively accessible via information input/output devices. The computer system can use a processor such as an Intel Pentium or Pentium II class processor, or other processors, such as those used in other computers, such as RISC and CISC based workstations and the like.

As is well known, the processor 120 operates using an operating system or "OS," such as Microsoft Windows, which operating system then performs system level operations that are desired, typically based upon instructions from an applications program. One embodiment of the present invention is an application program that implements the functions described hereinafter. It will be appreciated that several variations of the present invention may be carried out within the intended spirit and scope of the present invention. For example, software elements might be implemented in hardware or a combination of hardware and software. Similarly, given performance improvements and other ongoing technological advances, hardware elements might also be replaced by software or a combination of hardware and software.

Overall, in operation, this embodiment of the present invention receives front, back and through image information obtained from the scanning system 102. This information is operated upon by computer system 110, which provides information processing functions, which will be subsequently discussed. In this embodiment, the computer system 110 enables processing of received front, back and through image information to obtain red, green and blue image information that can be combined to create an image for viewing.

As described hereinafter, a preferred embodiment of computer system 110 performs image processing operations sequentially on different pixel data. A pixel is generally recognized as the smallest element that display or print hardware and software can manipulate in creating letters, numbers, or graphics. Those operations necessary to obtain the desired result for a given pixel will be referred to hereinafter as a processing cycle. It should be understood, however, that any number of conventional techniques generally utilized in the computer arts to provide serial and/or parallel processing of information can be similarly applied in accordance with the present invention.

FIG. 3 illustrates operation of the application program on the image information associated with each channel received from the electronic film development system 100. In step 302 one embodiment of an image processing method according to the present invention, begins by receiving image information from each of three input channels. The received image information is stored in memory 118 such that it can be accessed during subsequent operations. This image information may be input via input/output devices 116 (FIG. 1) and is preferably stored in random access memory (RAM) included in computer system 110. Thereafter, the processor 120 processes each primary image information channel for a given pixel, as described hereinafter, in order to be prepare the channels for subsequent combination.

In electronic film development scanner 102, information for the same pixel of an image may be obtained at different developing times, thereby creating a different set of information at each of the developing times. Ultimately, the information sets obtained at different development times will be combined so that there exists one set of data. According to the present invention, as described hereinafter, the operations that are used to enhance image quality and reduce noise can be implemented on each of the different information sets, the resultant information set, or combinations thereof. The following description encompasses the operations on a single information set. However, it will be appreciated that the described operations may operate repeatedly on the same or different information, and that the steps may be processed concurrently given appropriate computing facilities.

The method proceeds to step 304, where the processor retrieves the channel information associated with the pixel to be operated upon. It should also be understood that while the operation is described as a pixel operation, that a group of pixels could also be used to obtain the pixel values associated with a particular pixel location.

After the method retrieves pixel information in step 304, step 306 is executed to determine which primary channel is to be processed for that pixel. Once this determination is made, the processor is able to determine proper processing procedures for information pertaining to each of the three color channels.

In particular, in step 308, the processor filters the image information to remove noise from the current non-primary information channels more than the information from the primary color channel. In a preferred embodiment, the information associated with the primary color channel is not filtered at all. For example, if the current primary color channel is the red information channel, then the processor will filter the information from the red channel less than the information from the green and blue channels. In particular, while a bandpass filter will remove frequency components that are outside of the red color frequency range in order to eliminate the undesired (other than red) colors, the non-primary information is also filtered to remove noise that exists in the non-primary channels.

It has been determined that by noise filtering the primary color channel information less than the non-primary color channel data, a significant amount of real image information is maintained, rather than being lost due to noise filtering. Thus, since there is more real image information from the primary color channel, the resultant primary channel pixel value, described hereinafter, will provide for a more accurate representation of the true color associated with that primary channel for that pixel.

Thereafter, in step 310, the information from the primary channel and the non-primary channels is operated upon to obtain a resultant primary channel pixel value for that pixel. This operation is preferably a conventional matrix operation that can use any of a wide variety of known techniques that process crosstalk information in order to obtain an enhanced image. It should be recognized, however, that according to the present invention, although such techniques will also provide a resultant pixel values associated with the respective non-primary channels, such resultant pixel values associated with the non-primary channels are generally not used.

Rather, after a resultant primary channel pixel value for the first primary color channel is obtained, then step 312 determines whether there are any remaining primary color channels that need to be operated upon. If so then step 306 is repeated to determine the new primary color channel, and steps 308 and 310 are performed using a different primary color channel.

Once all resultant primary channel pixel values are obtained for a given pixel, then a decision step 314 determines if any other pixels need to operated upon, such that the above-described operations are repeated for each subsequent pixel. For each successive primary image information channel and each pixel, the computer system 110 retrieves and processes the associated image information and stores the resultant processed data. Following each processing cycle, the processor may delete either the original source image information (i.e. after completion of the processing cycle of the associated data) or the processed source image information obtained from a previous processing cycle (i.e. following completion of a further processing cycle), thereby conserving available space in information storage. Alternatively, such information may be stored using a non-volatile storage device such as a disk or tape drive. Additionally, both processed and unprocessed information may be stored using a computer readable medium, or transmitted to another location via network 150 (FIG. 1).

Figure 4:
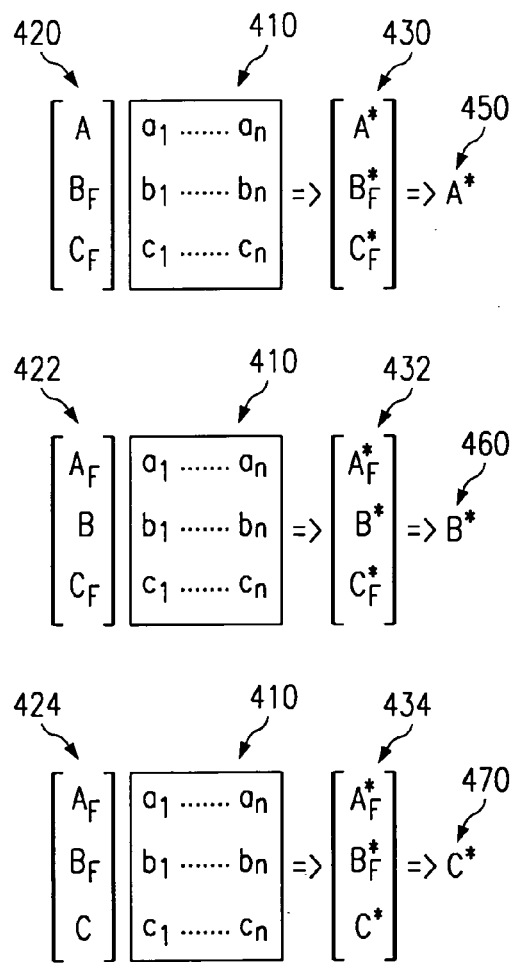
FIG. 4 is a series of three matrices illustrating the combination of three channels according to a preferred embodiment of the present invention.

Referring now to FIG. 4, combining the separate information channels to reconstruct an original image will be discussed. There are seven different matrices illustrated. First input matrix 420, second input matrix 422, third input matrix 424, combination matrix 410, first resultant matrix 430, second resultant matrix 432 and third resultant matrix 434. Also illustrated are reconstructed channel A 450, reconstructed channel B 460, and reconstructed channel C 470.

In accordance with one embodiment of the present invention, first matrix 420 contains three information channels. Channel A is the primary information channel that it is desired to reconstruct. Channel $B_F$ and $C_F$ are non-primary information channels. Channel A is not filtered, so all originally obtained information is retained. Both channel $B_F$ and $C_F$ have been operated on by combination matrix 410 to produce first resultant matrix 430. First resultant matrix 430 includes reconstructed channels $A^*$, $B_F^*$ and $C_F^*$. Each of the reconstructed channels is a combination of channels A, $B_F$ and $C_F$. The two non-primary reconstructed channels $B_F$ and $C_F$ are not used in this embodiment of the present invention, because a large amount of the information contained in the original channels has been filtered out.

Second matrix 422 and third matrix 424 are similar to first matrix 420, except that each matrix includes a different primary information channel. That is, second matrix 422 includes primary channel B, and third matrix 424 includes primary channel C. In each case, the primary channel is the channel for which reconstruction is desired, and each matrix operation produces a reconstructed information channel corresponding to the primary information channel.

The present invention can also be implemented within a system that also allows for other processing modes to be used. For instance, in a first mode, if noise is not a concern, then conventional processing can be utilized. In a second mode, if the current image processing type is one in which noise is a concern, then the processor can execute a method according to the present invention as described above.

As is apparent from the previous discussion, the invention enables a variety of integrated and stand-alone image processing system implementations. An electronic film development system is a preferred source of image data. However, other information sources are also contemplated as being within the intended scope of the present invention. For example, the present invention may be implemented utilizing copiers, scanners, optical character recognition systems, facsimile machines, and the like. In a conventional scanning system, the image information can be stored, transferred and/or downloaded, and then subsequently processed using the principles of the present invention as set forth above. Noise that would otherwise be introduced due to channel crosstalk can again be eliminated, without a significant loss of image detail.

While a preferred embodiment of the present invention is described as reconstructing, correcting, or improving a representation of an image originally recorded on color film, it will be appreciated that the present invention is not limited to this embodiment. The present invention may function to reconstruct, improve, transform or correct information from any media employing multiple information channels. For example, modulated broadcast signals make use of multiple sidebands, or channels, and stereophonic recordings use multiple channels to convey information. It should also be noted that the present invention can be used with varying numbers of channels. Although the present disclosure focuses on the use of three color channels, the invention should not be construed to be limited to the use of exactly three channels, and the channels used need not be arranged in layers.

As discussed earlier, at least one method of the present invention uses multiple information channels representative of a physical image, and combines these channels into a transformed, corrected, reconstructed or improved image. This improved image is preferably an electronic representation of the physical image, and is stored as a digital file embodied in a computer readable medium. The improved image contained in the digital file can then be extracted from the computer readable medium and reproduced using a suitable image output device.

What is claimed is:

1. A method for correcting image information associated with a plurality of information channels comprising:
   obtaining image information from a first information channel which is a primary information channel to be reconstructed;
   obtaining image information from at least one additional information channel, wherein at least a portion of the information from the at least one additional information channel includes information associated with the information obtained from the first channel;
   transforming only the image information obtained from the at least one additional information channel to obtain transformed image information associated with the first channel; and
   combining at least a portion of the transformed image information associated with the first information channel with at least a portion of the information from the first information channel to obtain corrected image information associated with the first information channel, wherein said corrected image information defines a reconstructed information channel that corresponds to said primary information channel.

2. The method as in claim 1, wherein transforming comprises filtering the image information obtained from the at least one additional information channel to minimize noise.

3. The method as in claim 1, wherein the method implements a color correction matrix.

4. The method as in claim 1, wherein the image information to be corrected is from a photographic image.

5. The method as in claim 1, further comprising obtaining image information from a third information channel, wherein the first information channel is a first color channel, the at least one additional information channel is a second color channel, and the third information channel is a third color channel.

6. The method as in claim 1, wherein at least a portion of the information obtained from the first channel includes information associated with the information obtained from the at least one additional channel, and wherein the method further comprises:
   transforming the image information obtained from the first information channel to obtain transformed image information associated with the at least one additional channel; and
   combining at least a portion of the transformed image information associated with the at least one additional channel with at least a portion of the image information obtained from the at least one additional channel to obtain corrected image information associated with the at least one additional channel.

7. The method as in claim 6, wherein the image information obtained from the at least one additional image information channel is substantially unaltered before combining.

8. The method as in claim 1, wherein the information obtained from the first information channel is substantially unaltered before combining.

9. The method as in claim 1, wherein obtaining image information comprises scanning an image.

10. The method as in claim 1, wherein obtaining image information comprises scanning a photographic image during development.

11. A digital file tangibly embodied in a computer readable medium, said digital file generated by implementing a method comprising:
    obtaining image information from a first information channel which is a primary information channel to be reconstructed;
    obtaining image information from at least one additional information channel, wherein at least a portion of the information from the at least one additional information channel includes information associated with the information obtained from the first channel;
    transforming only the image information obtained from the at least one additional information channel to obtain transformed image information associated with the first channel; and
    combining at least a portion of the transformed image information associated with the first information channel with at least a portion of the information from the first information channel to obtain corrected image information associated with the first information channel, wherein said corrected image information defines a reconstructed information channel that corresponds to said primary information channel.

12. The digital file as in claim 11, wherein transforming comprises filtering the image information obtained from the at least one additional information channel to minimize noise.

13. The digital file as in claim 11, wherein the method implements a color correction matrix.

14. The digital file as in claim 11, wherein the image information to be corrected is from a photographic image.

15. The digital file as in claim 11, further comprising obtaining image information from a third information channel, wherein the first information channel is a first color channel, the at least one additional information channel is a second color channel, and the third information channel is a third color channel.

16. The digital file as in claim 11, wherein at least a portion of the information obtained from the first channel includes information associated with the information obtained from the at least one additional channel, and wherein the method further comprises:
    transforming the image information obtained from the first information channel to obtain transformed image information associated with the at least one additional channel; and
    combining at least a portion of the transformed image information associated with the at least one additional channel with at least a portion of the image information obtained from the at least one additional channel to obtain corrected image information associated with the at least one additional channel.

17. The digital file as in claim 16, wherein the image information obtained from the at least one additional image information channel is substantially unaltered before combining.

18. The digital file as in claim 11, wherein the image information obtained from the first information channel is substantially unaltered before combining.

19. The digital file as in claim 11, wherein obtaining image information comprises scanning an image.

20. The digital file as in claim 11, wherein obtaining image information comprises scanning a photographic image during development.

21. An image processing system comprising:
- at least one illumination source capable of illuminating a physical medium;
- at least one detector enabled to generate electrical signals in response to light, said electrical signals representative of image information obtained from a first information channel and at least one additional information channel, wherein said first information channel is a primary information channel to be reconstructed, at least a portion of the information from the at least one additional information channel includes information associated with the information obtained from the first channel, and said detector further enabled to output said electrical signals for image processing;
- at least one processor;
- memory operably associated with said processor; and
- a program of instructions, said program of instructions capable of being stored in said memory and executed by said processor, said program of instructions enabled to transform only the image information obtained from the at least one additional information channel to obtain transformed image information associated with the first channel, and to combine at least a portion of the transformed image information associated with the first information channel with at least a portion of the information from the first information channel to obtain corrected image information associated with the first information channel, wherein said corrected image information defines a reconstructed information channel that corresponds to said primary information channel.

22. The image processing system as in claim 21, wherein said program of instructions is further enabled to filter the image information obtained from the at least one additional information channel to minimize noise.

23. The image processing system as in claim 21, wherein said program of instructions is enabled to implement a color correction matrix.

24. The image processing system as in claim 21, wherein the image information to be corrected is from a photographic image.

25. The image processing system as in claim 21, wherein said electrical signals further represent information from a third information channel, and wherein the first information channel is a first color channel, the at least an additional information channel is a second color channel, and the third information channel is a third color channel.

26. The image processing system as in claim 21, wherein at least a portion of the information obtained from the first channel includes information associated with the information obtained from the at least one additional channel, and wherein said program of instructions is further enabled to transform the image information obtained from the first information channel to obtain transformed image information associated with the at least one additional channel, and to combine at least a portion of the transformed image information associated with the at least one additional channel with at least a portion of the image information obtained from the at least one additional channel to obtain corrected image information associated with the at least one additional channel.

27. The image processing system as in claim 26, wherein the image information obtained from the at least one additional image information channel is substantially unaltered before combining.

28. The image processing system as in claim 21, wherein the image information obtained from the first information channel is substantially unaltered before being combined.

29. The image processing system as in claim 21, wherein the image processing system is a digital film processing system.

30. The image processing system as in claim 21, wherein the image processing system is a copy machine.

31. The image processing system as in claim 21, wherein the image processing system is a facsimile machine.

32. The image processing system as in claim 21, wherein the image processing system is a scanner.

* * * * *